(12) United States Patent
Cernay et al.

(10) Patent No.: US 10,100,655 B2
(45) Date of Patent: Oct. 16, 2018

(54) BRUSH SEAL AND METHOD FOR PRODUCING A BRUSH SEAL

(71) Applicant: MTU Aero Engines AG, Munich (DE)

(72) Inventors: Christoph Cernay, Bruckmuhl (DE); Stephan Prostler, Inning a. Ammersee (DE); Wolfgang Schmidmayr, Munich (DE); Julian Weber, Munich (DE); Benjamin Grobkurth, Munich (DE); Stefan Beichl, Herrsching (DE)

(73) Assignee: MTU AERO ENGINES AG, Munich (DE)

( * ) Notice: Subject to any disclaimer, the term of this patent is extended or adjusted under 35 U.S.C. 154(b) by 0 days.

(21) Appl. No.: 14/490,233

(22) Filed: Sep. 18, 2014

(65) Prior Publication Data

US 2015/0084285 A1 Mar. 26, 2015

(30) Foreign Application Priority Data

Sep. 20, 2013 (DE) ........................ 10 2013 218 913

(51) Int. Cl.
| | | |
|---|---|---|
| *F16J 15/44* | (2006.01) | |
| *F01D 11/00* | (2006.01) | |
| *F16J 15/3288* | (2016.01) | |
| *F02C 7/28* | (2006.01) | |

(52) U.S. Cl.
CPC ............ *F01D 11/00* (2013.01); *F01D 11/003* (2013.01); *F02C 7/28* (2013.01); *F16J 15/3288* (2013.01); *F05D 2240/56* (2013.01); *Y02T 50/671* (2013.01); *Y10T 29/49297* (2015.01); *Y10T 29/49826* (2015.01); *Y10T 29/49959* (2015.01)

(58) Field of Classification Search
CPC .. F16J 15/3288; F16J 15/3292; F01D 11/003; F01D 11/00; F02C 7/28; F05D 2240/56; Y10T 29/49297; Y10T 29/49826; Y10T 29/49959; Y02T 50/671
USPC ................ 277/355, 357, 359, 404, 405, 407
See application file for complete search history.

(56) References Cited

U.S. PATENT DOCUMENTS

| | | | | |
|---|---|---|---|---|
| 4,756,536 A * | 7/1988 | Belcher | ................... | F01D 11/02 277/355 |
| 4,989,886 A * | 2/1991 | Rulis | ....................... | F01D 11/00 277/355 |
| 2003/0006559 A1 * | 1/2003 | Inoue | ................... | F16J 15/3288 277/355 |
| 2005/0040602 A1 * | 2/2005 | Beichl | .................. | F16J 15/3288 277/355 |
| 2007/0187900 A1 * | 8/2007 | Datta | ........................... | 277/355 |

(Continued)

FOREIGN PATENT DOCUMENTS

| | | |
|---|---|---|
| DE | 19937932 A1 | 3/2001 |
| EP | 2204548 A1 | 7/2010 |

(Continued)

*Primary Examiner* — Nathan Cumar
(74) *Attorney, Agent, or Firm* — Barlow, Josephs & Holmes, Ltd.

(57) ABSTRACT

The invention relates to a brush seal, in particular for the sealing of gaps occurring in turbomachines, including a plurality of individual fibers, individual wires or bundles of individual fibers or wires, wherein, in each case, at least two individual fibers or wires, and/or at least two fiber bundles or wire bundles are braided or twisted into a fiber or wire package. In addition, the invention relates to a method for producing a brush seal.

14 Claims, 3 Drawing Sheets

(56) References Cited

U.S. PATENT DOCUMENTS

| | | | |
|---|---|---|---|
| 2008/0284107 A1* | 11/2008 | Flaherty et al. | 277/355 |
| 2009/0072486 A1* | 3/2009 | Datta | F16J 15/3288 |
| | | | 277/355 |
| 2010/0270747 A1* | 10/2010 | Ghasripoor | F16J 15/3288 |
| | | | 277/355 |
| 2010/0327535 A1* | 12/2010 | Grace | F16J 15/3288 |
| | | | 277/355 |

FOREIGN PATENT DOCUMENTS

| | | |
|---|---|---|
| GB | 2070700 A | 9/1981 |
| WO | WO2008127244 A1 | 10/2008 |

\* cited by examiner

BRUSH SEAL AND METHOD FOR PRODUCING A BRUSH SEAL

BACKGROUND OF THE INVENTION

The invention relates to a brush seal, in particular for the sealing of gaps occurring in turbomachines, comprising a plurality of individual fibers, individual wires, or bundles of individual fibers or wires. In addition, the invention relates to a method for producing a brush seal as well as a component comprising at least one brush seal.

Brush seals of the type named above are known in great number and are utilized, for example, in turbomachines, in order to seal the intermediate space between static and rotating components against leakage of the flow medium. There are a number of application cases in which two parts rotating relative to one another, such as, e.g., a stator and a rotor, must be sealed non-hermetically against each other. Such a case of application is, for example, the sealing of an annular gap through which gas flows between the housing and the rotor of a gas turbine for an aircraft. Often brush seals are used for the non-hermetic sealing of intermediate annular spaces between component assemblies rotating relative to one another, since brush seals have the same sealing effect as labyrinth seals, but are lighter in weight and more compact. A corresponding brush seal is described, e.g., in DE 195 27 605 A1. The use of brush seals thus permits optimizing the structural design of rotors and housings. Significant savings in cost and weight are obtained by this reduction in structural space, particularly in engine construction. Methods for producing brush seals are described in DE 36 06 284 C2 and EP 0 211 275 A2. There is the problem, however, that with the use of relatively thin individual fibers, in particular with the use of appropriate plastic fibers, due to the small amount of stiffness in the individual fibers, it is not possible to produce brush seals with longer bristles for bridging larger gaps between the components to be sealed. Known brush seals, particularly having relatively thin bristles, therefore cannot be utilized in regions with high relative movements.

BRIEF SUMMARY OF THE INVENTION

The object of the present invention is thus to provide a brush seal of the type named initially, which is suitable for application in regions with large movements of components relative to one another. Another object of the invention is to provide a suitable method for producing this brush seal.

The objects are achieved according to a brush seal in accordance with the present invention. Advantageous embodiments with appropriate enhancements of the invention are described herein, wherein advantageous embodiments of the brush seal can be viewed as advantageous embodiments of the method, and vice versa.

A brush seal according to the invention, in particular for the sealing of gaps occurring in turbomachines, comprises a plurality of individual fibers, individual wires, or bundles of individual fibers or wires, whereby in each case at least two individual fibers or wires and/or at least two fiber or wire bundles are braided or twisted into a fiber or wire package. The braiding or twisting of individual fibers, wires, or bundles of individual fibers or wires into a type of fine braid leads to fiber or wire packages, which have a clearly greater stiffness than the corresponding individual fibers, wires, or bundles. The fiber or wire bundles can therefore be composed of at least two individual fibers or individual wires laid down parallel to one another or braided or twisted together. Also, plastics, ceramics, and/or carbon, as well as metal or a metal alloy can be used as the material for the individual fibers. In particular, the individual fibers can be composed of a polyamide such as aramid, for example. Another advantage results thereby, in that longer bristles of materials having a small amount of stiffness, such as, for example, very thin aramid fibers having a diameter in the range of 0.01 mm may also be used for brush seals with longer bristles. New fields of application for static and dynamic applications thereby result for the brush seal according to the invention, applications that were previously not possible due to the movements of components relative to one another that are too great. Fields of application for the brush seal according to the invention particularly relate to application in aircraft engines, industrial gas turbines, steam turbines, industrial compressors, or also many other engineering applications.

In another advantageous embodiment of the brush seal according to the invention, the diameter of the fiber package or supporting package amounts to between 0.05 and 2.0 mm. The intrinsic stiffness of the fiber packages and wire packages resulting therefrom makes possible the named use of longer fibers or bristles of materials having a smaller amount of stiffness.

In additional advantageous embodiments of the brush seal according to the invention, a plurality of fiber packages and wire packages are disposed inside a brush seal housing, at least partially. In this case, the fiber or wire packages can be wound around a core wire and can be fastened to the latter by means of a clamping tube, the clamping tube being disposed inside the brush seal housing. There is also the possibility that the brush seal housing is formed in two parts. The brush seal according to the invention can be designed in a plurality of different variants that are oriented to requirements, in particular the required sealing properties.

Another aspect of the present invention relates to a method according to the invention for producing a brush seal, wherein the method comprises the following method steps: providing individual fibers, individual wires, or bundles of individual fibers or wires; in each case, braiding or twisting of at least two individual fibers or wires, and/or at least two fiber bundles or wire bundles into a fiber or wire package; arranging a plurality of fiber or wire packages at least partially inside a brush seal housing; and cutting the fiber or wire packages. Instead of the individual fibers that are usually used, according to the invention, the braided or twisted fiber or wire packages are used for the production of brush seals. It is thereby possible to utilize relatively thin fibers that could be used previously only for brush seals having short fiber lengths of approximately 3 to 6 mm. Longer individual fibers would no longer spring back after being compressed, due to their small amount of intrinsic stiffness. After the appropriate arranging of the fiber or wire bundles in the brush seal housing, the fiber packages can be cut corresponding to the required lengths. The fiber packages also can be produced, however, with predetermined and already prefabricated fiber lengths. It is now possible with the method according to the invention to produce brush seals that are suitable for application in regions where components have large movements relative to one another.

In advantageous embodiments of the method according to the invention, the fiber or wire packages are wound around a core wire and fastened to the latter by means of a clamping tube, prior to the step of arranging them inside the brush seal housing. This construction assures a form-fitting and secure holding of the fibers inside the brush seal housing. The fiber or wire bundles used can be composed of at least two individual fibers or individual wires laid down parallel to one another or braided or twisted together. Also, the individual fibers may be composed of plastics, ceramics, carbon, metal, or metal alloys.

Another aspect of the present invention relates to a component of a turbomachine comprising at least one brush seal described in the preceding. Due to the named advantageous properties of the brush seal according to the invention, the latter also can be used for bridging larger gaps, i.e., for example, gaps larger than 0.5 mm.

BRIEF DESCRIPTION OF THE DRAWINGS

Further features of the invention result from the claims, the embodiment examples, as well as on the basis of the drawings. The features and combinations of features named in the preceding description, as well as the features and combinations of features named in the examples of embodiment below can be used not only in the combination indicated for each case, but also in other combinations, without departing from the scope of the invention. Herein:

DETAILED DESCRIPTION OF THE INVENTION

Figure 1:
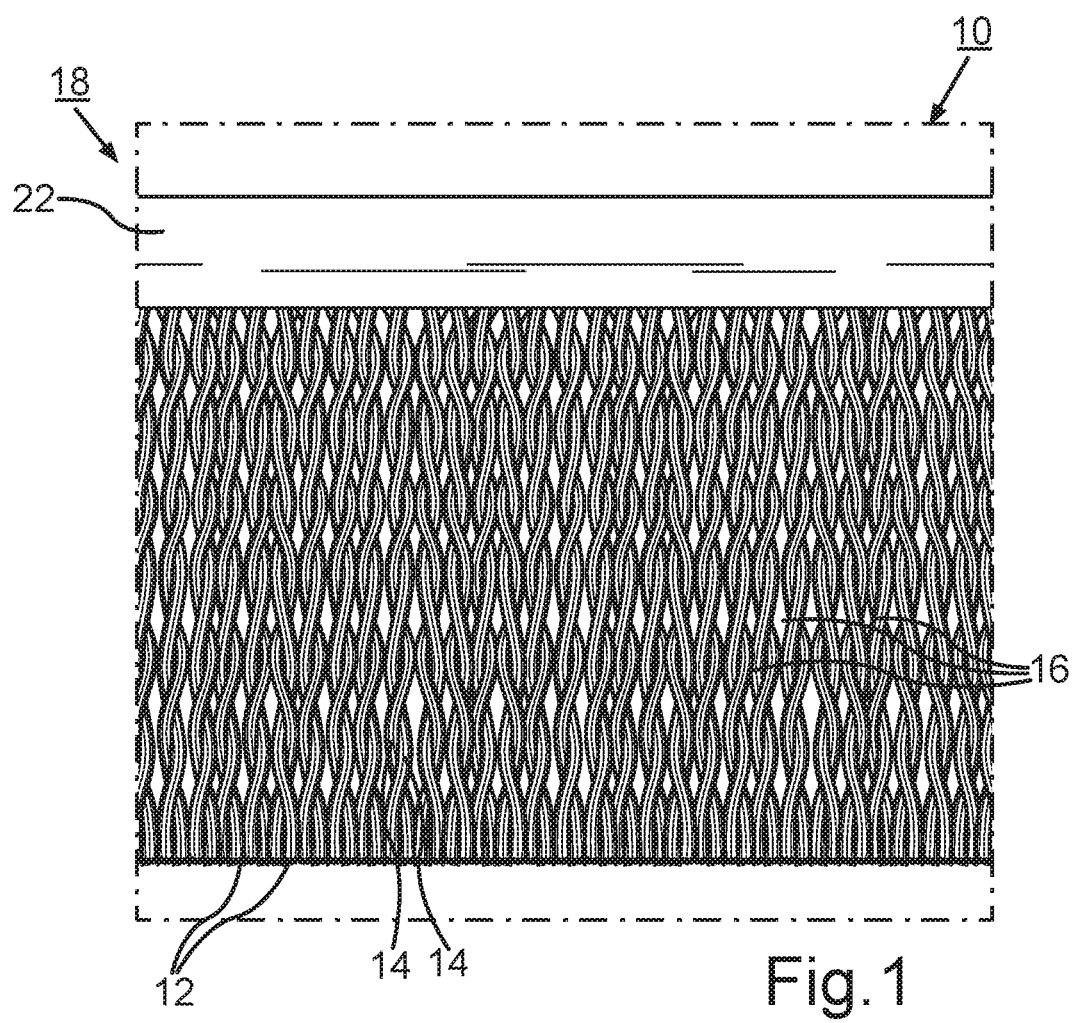
FIG. 1 shows a schematic representation of a partial region of the brush seal according to the invention.
Figure 3:
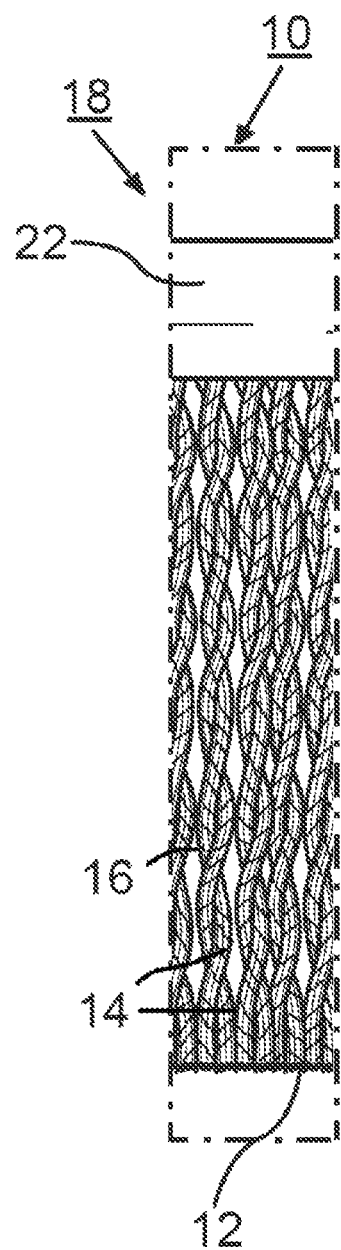
FIG. 3 shows a schematic representation of an alternative embodiment of a partial region of the brush seal according to the invention.

FIG. 1 shows a schematic representation of a partial region of a brush seal 10. The brush seal 10 serves in particular for the sealing of gaps occurring in turbomachines. It is recognized that the brush seal 10 is composed of a plurality of individual fibers 12, which are arranged in each case into a fiber bundle 14. The fiber or wire bundles can therefore be composed of at least two individual fibers or individual wires laid down parallel to one another or braided or twisted together. Here, in FIG. 1, the individual fibers 12 lie approximately parallel to one another. In FIG. 3, the individual fibers 12 are braided to one another. The fiber bundles 14 are in turn braided or twisted together into one fiber package 16. In the embodiment example shown, in the simplest configuration and for better representation, two individual fiber bundles 14 are twisted each time into a fiber package 16. There is also the possibility, of course, that three, four, five, or a plurality of fiber packages 16 are braided or twisted together for the formation of a fine braid. In addition, there is the possibility that a plurality of individual fibers are braided or twisted directly into corresponding fiber packages 16.

The individual fibers 12 are composed of plastic, namely an aromatic polyamide, i.e., an aramid. The diameter of these individual fibers 12 is approximately 0.01 mm. The aramid fibers 12 that are shown have a relatively small intrinsic stiffness, so that previously, with the individual fibers 12 shown, only brush seals with short fiber lengths, i.e., approximately 3 to 6 mm, could be produced. Now, seals with clearly longer fiber lengths can be produced with the brush seal 10 shown, in order to bridge relatively large gaps. The braiding of the individual fiber bundles 14 or individual fibers 12 into the fiber package 16 results in clearly greater stiffness of the fiber package 16. In this case, approximately 6500 to 8500 individual fibers can be braided together per millimeter of diameter. Due to this clearly greater density in comparison to the conventional brush seal, there results the already mentioned greater stiffness of the fiber package 16. The diameter of the individual fiber packages 16 used in the example of embodiment shown here amounts to approximately 700 µm. In addition, there is the possibility that, in addition to plastics, ceramics or carbon, also metal or metal alloys are used for the production of the individual fibers 12. If individual fibers made of metal should be used, then for example, four individual fibers, each with a diameter of 0.2 mm, can be braided or twisted into a wire package. The usual fiber or wire packages 16 have a diameter of approximately 0.05 to 2.0 mm.

In addition, it is recognized that the fiber packages 16 are arranged partially inside a brush seal housing 18. The brush seal housing 18 in this case comprises a clamping tube 22, in which the individual fiber packages 16 are fastened.

Figure 2:
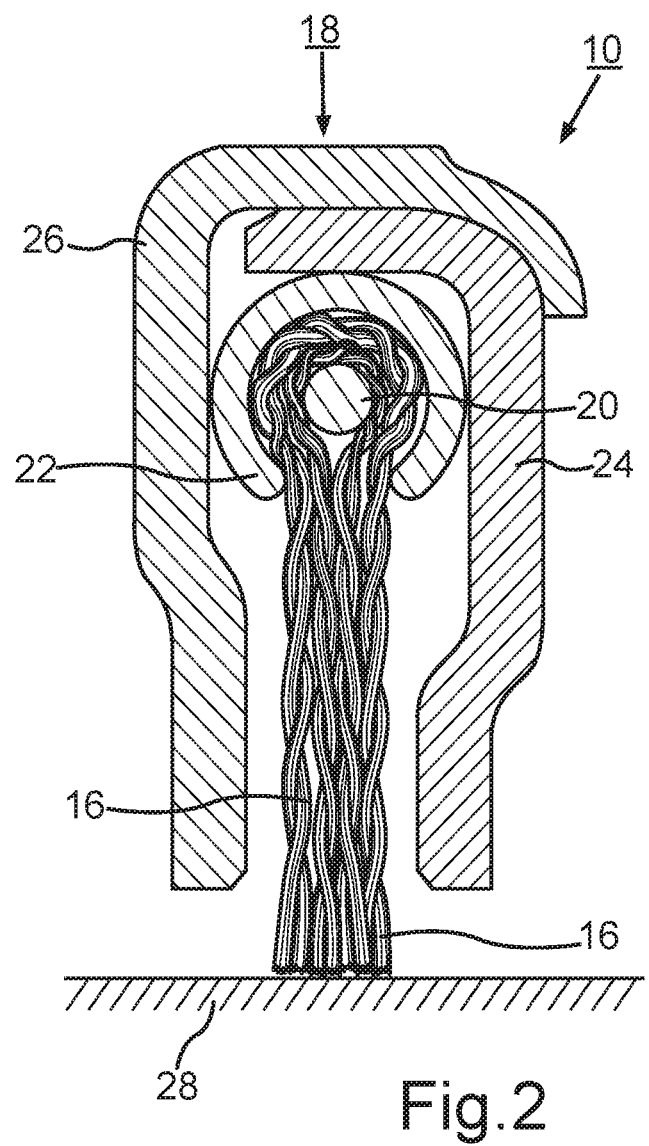
FIG. 2 shows a schematic, partially cut-away representation of a brush seal according to the invention.

FIG. 2 shows a schematic, partially cut-away representation of the brush seal 10. Unlike FIG. 1, here the embodiment of the brush seal housing 18 and the arrangement of the fiber packages 16 are shown inside the brush seal housing 18. Only two fiber packages 16 are shown in FIG. 2 for simplified illustration. It is recognized that the fiber packages 16 in braided or twisted state are wound around a core wire 20. Of course, the brush seal 10 comprises not only two fiber packages 16 wound around the core wire, but a plurality of fiber packages 16, which can be wound next to one another, and also over one another.

In addition, it can be recognized that the brush seal housing 18 is formed in two parts. In this case, the brush seal housing 18 is composed of a support ring 24, which prevents a bending of the fiber packages 16 in the axial direction. Joined to the support ring 24 is a covering ring 26, which will deter disruptive flow effects on the fiber packages 16 lying in front in the flow direction of the flow medium. The covering ring 26 and the support ring 24 form an uptake space for receiving a clamping tube 22. The fiber packages 16 in this case are wound approximately circularly around the core wire 20. The fiber packages 16 are fastened to the core wire 20 by means of the clamping tube 22. The clamping tube 22 is disposed inside the brush seal housing 18. It is recognized that the ends of the fiber packages 16 disposed outside the brush seal 10 are applied at a rotating component 28 and seal the gap formed between the rotating component 28 and another component (not shown) in which the brush seal 10 is disposed.

The invention claimed is:

1. A brush seal for the sealing of gaps occurring in turbomachines, comprising:
    a plurality of individual fibers or wires;
    at least two of the individual fibers or wires are braided together, along their length, into at least two fiber bundles or wire bundles, wherein each of the at least two fiber bundles or wire bundles includes at least two fibers or wires braided together along their length;
    the at least two fiber bundles or wire bundles are braided or twisted, along their length, into a fiber or wire package configured as a bristle for the brush seal; the diameter of the fiber package or wire package being between 0.05 and 2.0 mm; and
    a plurality of fiber packages or wire packages being configured and arranged as the brush seal for bridging a large gap between components in the turbomachine.

2. The brush seal according to claim 1, wherein the individual fibers are composed of plastics, ceramics, and/or carbon, and the individual wires are composed of metal or a metal alloy.

3. The brush seal according to claim 2, wherein the individual fibers are composed of a polyamide.

4. The brush seal according to claim 1, wherein a plurality of fiber or wire packages are disposed at least partially inside a brush seal housing.

5. The brush seal according to claim 4, wherein the fiber or wire packages are wound around a core wire and are fastened to the latter by means of a clamping tube, the clamping tube being disposed inside the brush seal housing.

6. The brush seal according to claim 4, wherein the brush seal housing is formed in two parts.

7. A method for producing a brush seal for gaps in turbomachines comprising the following steps:
   providing individual fibers or individual wires;
   braiding or twisting at least two of the individual fibers or individual wires along their length, into at least two fiber bundles or wire bundles, wherein each of the at least two fiber bundles or wire bundles includes at least two fibers or wires braided together along their length;
   braiding the at least two fiber bundles or wire bundles into a fiber or wire package; and
   arranging a plurality of fiber or wire packages at least partially inside a brush seal housing for bridging a large gap.

8. The method according to claim 7, further comprising the steps of:
   prior to the step of arranging the fiber or wire packages inside the brush seal housing, winding the fiber or wire packages around a core wire and fastening to the latter by means of a clamping tube.

9. The method according to claim 7, wherein the individual fibers are composed of plastics, ceramics, and/or carbon, and the individual wires are composed of metal or a metal alloy.

10. The method according to claim 7, further comprising the step of:
    before or after the at least partial arrangement of the fiber or wire packages in the brush seal housing, cutting the fiber or wire packages.

11. The brush seal according to claim 1, wherein the diameter of each individual fiber or individual wire is approximately 0.01 mm.

12. The brush seal according to claim 11, wherein each individual fiber or individual wire is an aramid fiber.

13. The brush seal according to claim 1, wherein the large gap is more than 0.5 mm.

14. The brush seal according to claim 7, wherein the large gap is more than 0.5 mm.

* * * * *